(12) United States Patent
Matsuda et al.

(10) Patent No.: US 6,285,923 B1
(45) Date of Patent: Sep. 4, 2001

(54) VEHICLE RUNNING CONTROL APPARATUS (75) Inventors: Shohei Matsuda; Hirotatsu Tsuchida, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/350,092

(22) Filed: Jul. 9, 1999

(30) Foreign Application Priority Data

Jul. 10, 1998 (JP) .................................. 10-196260

(51) Int. Cl.$^7$ ................................. G06F 165/00
(52) U.S. Cl. ................... 701/1; 701/36; 701/41; 701/43; 701/70; 701/72; 342/357.09; 342/357.1; 342/357.12; 340/901; 340/905; 180/142; 280/707
(58) Field of Search .................. 701/1, 26, 72, 701/208; 340/438

(56) References Cited

U.S. PATENT DOCUMENTS 5,508,929 * 4/1996 Harada ................................. 701/21
6,125,324 * 9/2000 Matsuda et al. ..................... 701/208
6,141,617 * 10/2000 Matsuda et al. ..................... 701/72

* cited by examiner

Primary Examiner—William A. Cuchlinski, Jr.
Assistant Examiner—Tuan C To
(74) Attorney, Agent, or Firm—Arent Fox Kintner Plotkin & Kahn, PLLC (57) ABSTRACT A profile of a designated road by which a vehicle is guided to a destination is predicted by road map data. In the case where it is difficult for the own vehicle to pass through a curve of the designated road ahead of the own vehicle, a warning is given to a driver or vehicle speed is automatically reduced. Whether or not the car is correctly running on the designated road is decided by deviation $\Delta\theta$ $(=\theta_V - \theta_M)$ between azimuth angle $\theta_V$ of the actual advancing direction of the own vehicle and azimuth angle $\theta_M$ of the designated road. When it is decided that there is a possibility that the own vehicle is running off the designated road, the warning is given or automatic speed reduction is stopped or suppressed. Due to the foregoing, it is possible to prevent the own vehicle from being improperly controlled and it becomes possible for a driver from feeling a sense of incongruity.

10 Claims, 8 Drawing Sheets

VEHICLE RUNNING CONTROL APPARATUS

BACKGROUND OF THE INVENTION

1. Field of the Invention

The present invention relates to a running control apparatus for car use by which a profile of a road ahead of an own vehicle is predicted according to road map information composed of a collection of plurality of nodes and a running state of the own vehicle is controlled according to the result of the prediction.

2. Description of the Related Art

Figure 4:
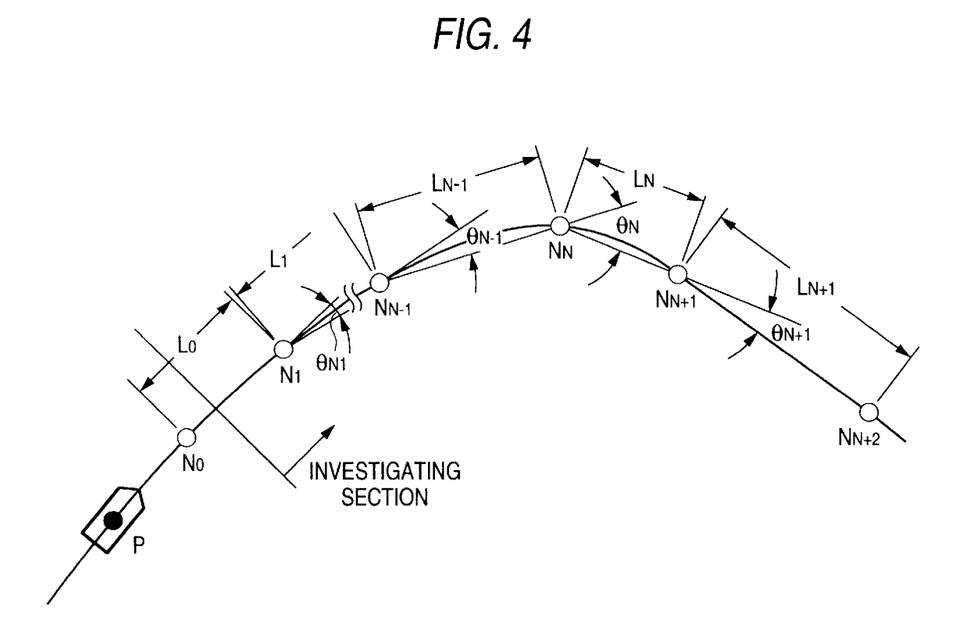
FIG. 4 is a schematic illustration for explaining reference node N, link length L and crossing angle θ.

The above running control apparatus for car use has already been proposed in U.S. patent application Ser. No. 09/056,244 by the present applicant. This running control apparatus for car use operates as follows. As shown in FIG. 4, there are provided coordinates composed of a large number of nodes $N_N$ ($N_N = N_0, N_1, N_2, N_3 \ldots$) which are set at predetermined intervals on a road so that they can be used as road map data. According to link length $L_N$ defined as a distance between nodes $N_N$ and $N_{N+1}$ which are adjacent to each other and also according to crossing angle $\theta_N$ defined as an angle formed by one link $N_{N-1} N_N$ and another link $N_N N_{N+1}$ which is located ahead of link $N_{N-1} N_N$, a passing state decision quantity (car turning quantity) $\theta_N/L_N$ is computed. A passable speed of node $N_N$ computed according to the passing state decision quantity $\theta_N/L_N$ is compared with a passage predicting speed at which the own vehicle passes through node $N_N$, and when it is decided that it is difficult for the own vehicle to pass through node $N_N$, a warning is given to a driver or an automatic speed reduction is conducted on the own vehicle. The above passing state decision quantity $\theta_N/L_N$ corresponds to a change quantity in an azimuth angle of the vehicle with respect to a moving distance of the vehicle. When this value is high, it is indicated that the road is curved, and when this value is low, it is indicated that the road is straight.

In this connection, in a navigation system to which the above running control apparatus for car use is applied, a decision whether or not the own vehicle is actually running on a road, the route of which can precisely guide the own vehicle to the destination (this road is referred to as a designated road hereinafter), that is, a decision whether the own vehicle is on route or off route is conducted by a method of map matching in which a moving locus of the own vehicle is superimposed on a road profile. Accordingly, when the own vehicle is transferred from a state of off-route to a state of on-route, alternatively when the own vehicle is transferred from a state of on-route to a state of off-route, there is temporarily generated a section in which it is impossible to decide whether or not the own vehicle is running on the designated road. In this case, the following problems may be encountered. Although the own vehicle is in a state of off-route, it is mistakenly decided that the own vehicle is in a state of on-route, and a warning is given to a driver or an automatic speed reduction is conducted on the own vehicle according to a profile of the designated road, that is, there is a possibility that the driver feels a sense of incongruity.

SUMMARY OF THE INVENTION

The present invention has been accomplished in view of the above circumstances. It is an object of the present invention to prevent controlling an own vehicle improperly according to a profile of a road on which the own vehicle is not actually running, that is, it is an object of the present invention to properly control the own vehicle so that a driver can not feel a sense of incongruity.

In order to accomplish the above object, according to the first aspect, there is provided a vehicular running control apparatus comprising: a road map information storing device storing road map information; an own vehicle position detecting device detecting an own vehicle position on a road; a running state detecting device detecting a running state of the own vehicle; a passage deciding device deciding whether or not the own vehicle can pass through a designated road, according to a profile of the designated road in the front of the own vehicle which has been read from the road map information storing device and also according to a running state of the own vehicle detected by the running state detecting device; a vehicle controlling device controlling a running state of the own vehicle according to a result of the decision of the passage deciding device so that the own vehicle can pass through the designated road; and an on-route deciding device deciding whether or not the own vehicle is actually running on the designated road, wherein the vehicle controlling device changes control of the own vehicle according to the result of decision of the on-route deciding device.

According to the above constitution, it is decided whether or not the own vehicle is running on the designated road ahead of the own vehicle which has been read from the road map information storing device, and a running state of the own vehicle is controlled according to the result of the decision. Therefore, it is possible to prevent the own vehicle from being improperly controlled when it is running on a road which is not the designated road. Accordingly, the driver can avoid feeling a sense of incongruity.

According to the second aspect of the invention, in a vehicular running control apparatus according to the first aspect, the on-route deciding device may decide a probability that the own vehicle is actually running on the designated road.

According to the third aspect of the invention, in a vehicular running control apparatus according to the first aspect, the on-route deciding device may conduct the decision according to deviation between a direction of the designated road and an advancing direction of the own vehicle detected by the running state detecting device.

According to the above constitution, whether or not the own vehicle is actually running on the designated road is decided by deviation between a direction of the designated road and an advancing direction of the own vehicle. Therefore, the decision can be accurately made.

According to the fourth aspect of the invention, in addition to a vehicular running control apparatus according to the third aspect, the on-route deciding device may decide that the own vehicle is actually running on the designated road when deviation is lower than a first threshold value.

According to the fifth aspect to the invention, in addition to a vehicular running control apparatus according to the fourth aspect, the on-route deciding device may decide that the own vehicle is not actually running on the designated road when deviation is not less than a second threshold value which is higher than the first threshold value.

According to the sixth aspect of the invention, in addition to a vehicular running control apparatus according to the fifth aspect, the first threshold value and the second threshold value may increase according to an increase in a moving distance of the own vehicle.

According to the above constitution, when a moving distance of the own vehicle is increased, the first and the second threshold value are also increased. Therefore, even if errors are accumulated so that the deviation is increased, it is possible to prevent the occurrence of a mistaken decision that the own vehicle is in a state of off-route although it is actually running in a state of on-route.

According to the seventh aspect of the invention, in addition to a vehicular running control apparatus according to the first aspect, the running state of the own vehicle may be controlled by the vehicle controlling device which gives a warning to a driver or conducts a speed adjustment of the own vehicle.

According to the above constitution, when it is decided that the own vehicle can not pass through the designated road, the driver is given a warning or the speed of the own vehicle is adjusted. Accordingly, it is possible to change a running state of the car and pass through the designated road positively.

According to the eighth aspect of the invention, in addition to a vehicular running control apparatus according to the second aspect, the vehicle controlling device may suppress control of the running state of the own vehicle according to a decrease in the probability decided by the on-route deciding device.

According to the above constitution, when the probability that the own vehicle is running on the designated road is low, control of the running state of the own vehicle is suppressed. Therefore, it is possible to avoid the occurrence of such a case that an improper vehicle control, which is not suitable for a profile of the road on which the own vehicle is running, is conducted and the driver feels a sense of incongruity.

According to the ninth aspect of the invention, in addition to a vehicular running control apparatus according to the first aspect, when an intersection or a branch exists on the designated road, the vehicle controlling device may stop controlling a running state of the own vehicle on a road ahead of the intersection or the branch.

According to the above constitution, even if the own vehicle deviates from the designated road at an intersection or a branch, it is possible to avoid the occurrence of such a case that an improper vehicle control, which is not suitable for a profile of the road on which the own vehicle is running, is conducted and the driver feels a sense of incongruity.

DETAILED DESCRIPTION OF THE PREFERRED EMBODIMENTS

Referring to the appended drawings in which an embodiment of the present invention is shown, the present invention will be explained below.

Figure 1:
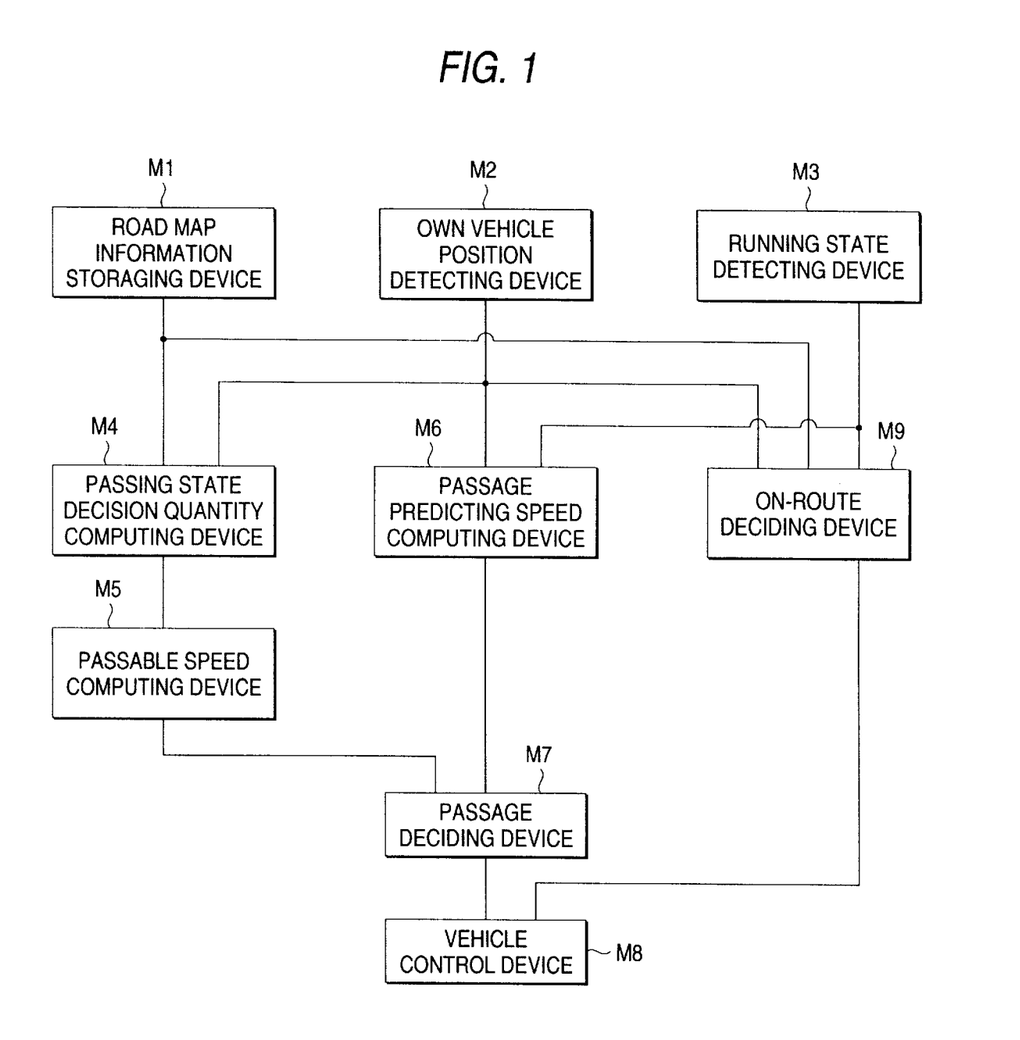
FIG. 1 is a block diagram showing an overall arrangement of a passage deciding apparatus of a vehicle.

As shown in FIG. 1, a vehicular running control apparatus incorporated into a vehicle includes: a road map information storing device M1; an own vehicle position detecting device M2; a running state detecting device M3; a passing state decision quantity computing device M4; a passable speed computing device M5; a passage predicting speed computing device M6; a passage deciding device M7; a vehicle controlling device M8; and an on-route deciding device M9.

The road map information storing device M1 and own vehicle position detecting device M2 are incorporated into a well known navigation system used for an automobile. Road map information storing device M1 reads out and outputs a predetermined range of road map data stored on IC card, CD-ROM and MO (magnetic optical disk) on which data can be rewritten. Own vehicle position detecting device M2 superimposes own vehicle position data, which has been received from GSP antenna, on the road map data, so that own vehicle position P can be detected on a map. The road map data is composed of coordinates including a large number of nodes $N_N$ which are set on a road at predetermined intervals. Running state detecting device M3 is composed of a vehicle speed sensor for detecting speed V of the own vehicle and a yaw rate sensor for detecting yaw rate YR of the own vehicle.

The passing state decision quantity computing device M4 computes a passing state decision quantity $\theta_N/L_N$ at each node $N_N$ on a designated road according to a profile of the road ahead of own vehicle position P which has been read from road map information storing device M1, that is, according to a profile of the road (designated road) on which the own vehicle is going to run from now on. The passing state decision quantity $\theta_N/L_N$ is an index expressing a degree of a curvature of the designated road. The higher the passing state decision quantity $\theta_N/L_N$, the smaller the turning radius, and the lower the the passing state decision quantity $\theta_N/L_N$, the larger the turning radius.

The passable speed computing device M5 computes a passable speed $V_{maxN}$ which is the maximum vehicle speed at which the own vehicle can safely pass through each node $N_N$ according to the passing state decision quantity $\theta_N/L_N$ and setting limit lateral acceleration G or setting limit yaw rate YR, which has been previously set.

The passage predicting speed computing device M6 computes a passage predicting speed $V_N$ at which the own vehicle passes through each node $N_N$ according to vehicle speed V detected by the running state detecting device M3, own vehicle position P detected by the own vehicle position detecting device M2 and reference deceleration β which has been previously set.

The passage deciding device M7 compares the passable speed $V_{maxN}$, which is computed by the passable speed computing device M5, with the passage predicting speed $V_N$ which is computed by the passage predicting speed computing device M6. Due to the above comparison, the passage deciding device M7 decides whether or not the own vehicle can pass through each node $N_N$ of the designated road. Specifically, the decision is conducted as follows. When $V_N \leq V_{maxN}$ as a result of comparison in which the passage predicting speed $V_N$ is compared with the passable speed $V_{maxN}$, it is decided that the own vehicle can pass through mode $N_N$, and when $V_N > V_{maxN}$ as a result of comparison, it is decided that the own vehicle can not pass through node $N_N$.

The vehicle controlling device M8 includes: a warning device composed of a buzzer or lamp; an automatic brake device for automatically reducing a vehicle speed; a shift-down device for shifting down an automatic transmission; and a vehicle speed adjusting device composed of an engine output reduction device. When the passage deciding device M7 decides that it is difficult for the own vehicle to pass through node $N_N$, the warning device is activated so that the driver can spontaneously reduce a vehicle speed, and at the same time the vehicle speed adjusting device is operated so that the vehicle speed can be automatically reduced.

According to a profile of the designated road which has been read out from the road map information storing device M1, a position P of the own vehicle detected by the own vehicle position detecting device M2, the vehicle speed V detected by the running state detecting device M3 and yaw rate YR, the on-route deciding device M9 decides whether the own vehicle is on the designated road or off the designated road, that is, whether the own vehicle is on route or off route. According to the result of the above decision, the vehicle controlling device M8 changes the content of control conducted by the warning device and the vehicle speed adjusting device.

Next, referring to FIGS. 2 to 4, the function of the vehicular running control apparatus will be explained in detail when the own vehicle is running on the designated road correctly. In other words, the function of the device shown in FIG. 1 except for the on-route deciding device M9 will be explained in detail.

Figure 2:
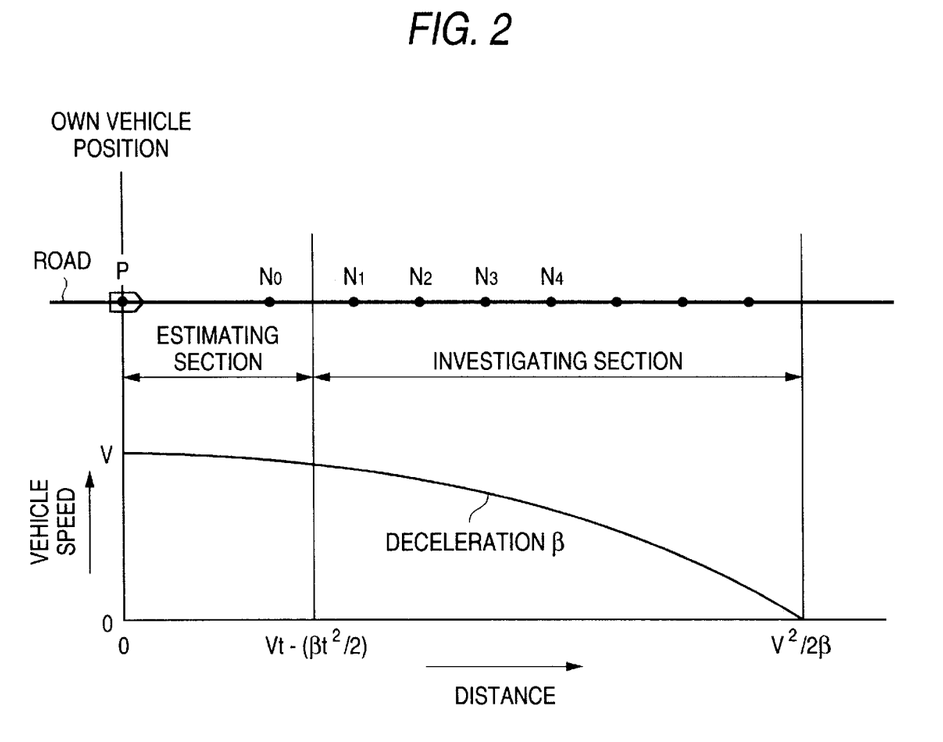
FIG. 2 is a schematic illustration for explaining an estimating section and an investigating section.

As shown in FIG. 2, an estimating section and an investigating section are set on the designated road ahead of own vehicle position P. The estimating section is set between own vehicle position P and node $N_N$ at which decision whether or not the vehicle can pass through is conducted. A predetermined period of time "t" is ensured from when the own vehicle passes through the estimating section to when the own vehicle reaches node $N_N$, and decision whether or not the vehicle can pass through is conducted in this predetermined period of time "t", and at the same time the warning is given to the driver and the automatic speed reduction is carried out. The investigating section is provided for deciding whether or not the own vehicle can pass through node $N_N$ which exists in the investigating section. Due to the foregoing, it is possible to avoid conducting an unnecessary decision on further node $N_N$ which is located in the distance.

The estimating section is determined as follows. On the assumption that the driver spontaneously starts applying the brake at own vehicle position P so that the own vehicle can pass through a curve located ahead of the own vehicle, reference deceleration β, which is estimated to be generated by the braking operation, is preset, and thus the estimating section is determined by $Vt-(βt^2/2)$ which is a distance in which the own vehicle proceeds in the predetermined period of time "t". A start point of the investigating section is set at an end of the estimating section. An end of the investigating section is set at a position at which the own vehicle, which is decelerated at the reference deceleration β, stops, that is, an end of the investigating section is set at a position which is distant from own vehicle position P by the distance of $V^2/2β$.

Figure 3:
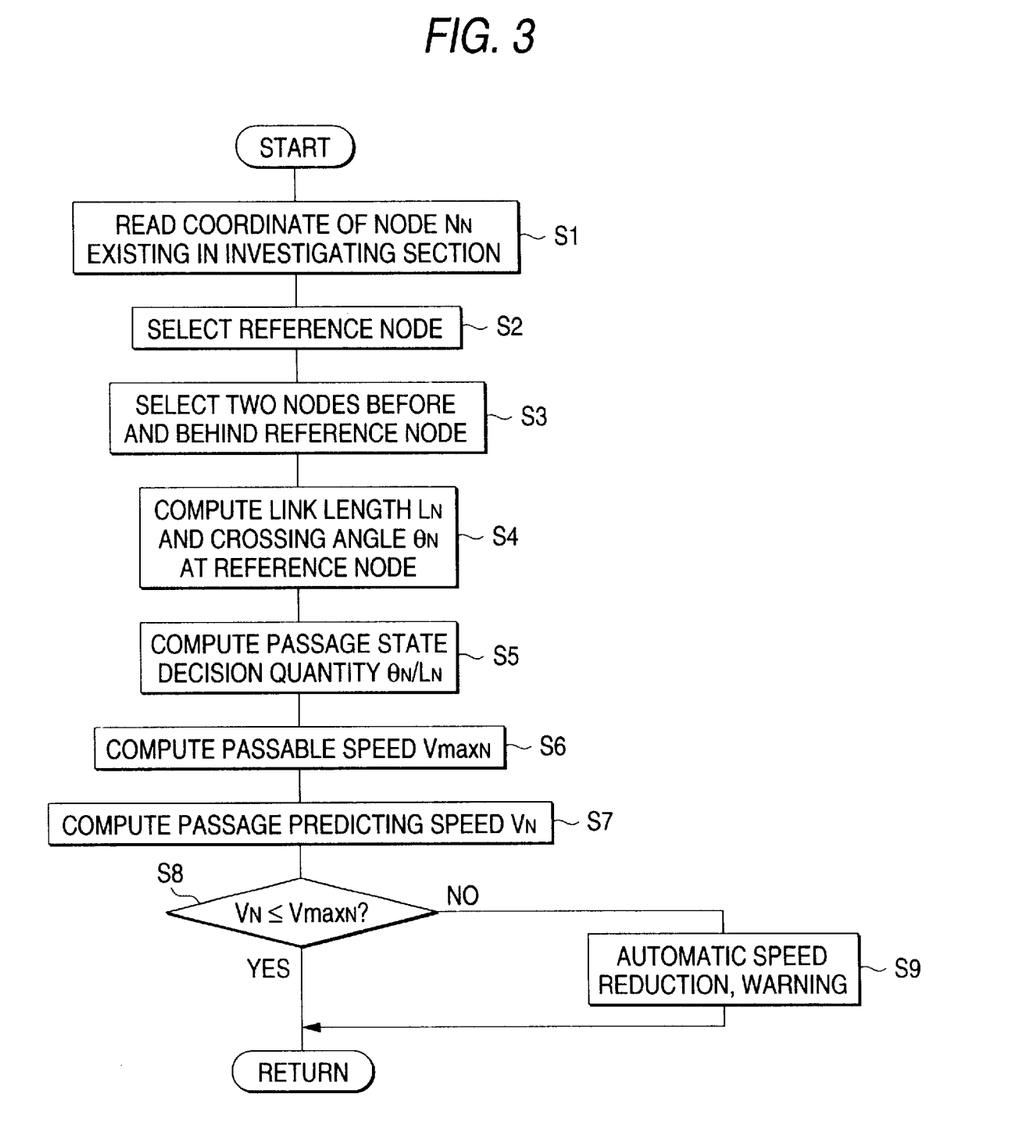
FIG. 3 is a flow chart of a fundamental control routine.

In step S1 in the flow chart shown in FIG. 3, coordinates of a plurality of nodes N . . . (N=$N_1$, $N_2$, $N_3$ . . . ) are read in. In step S2, either of the plurality of nodes N . . . , which are located in the investigating section, is selected to be reference node $N_N$. Reference node $N_N$ is successively selected from the first node $N_1$ to the next node $N_2$ with respect to all nodes N . . . located in the investigating section. Passable decision of the own vehicle is carried out for each of the thus selected reference nodes $N_N$.

As shown in FIG. 4, in step S2, reference node $N_N$ is selected. Then, in step S3, two nodes $N_{N-1}$, $N_{N+1}$, which are adjacent to the reference node $N_N$, are selected. In step S4, according to the coordinates of the three nodes $N_{N-1}$, $N_N$, $N_{N+1}$, the link length $L_N$ and crossing angle $θ_N$ at reference node $N_N$ are computed.

In this connection, in the case where the first node $N_1$ located in the investigating section is selected as the reference node $N_1$, the first node $N_0$ at the rear of the investigating section is selected as a node adjacent to the first node $N_1$ at the rear. In this case, when the node $N_0$ does not exist between the own vehicle position P and the reference node $N_1$, the own vehicle position P is selected instead of the node $N_0$.

When the link length $L_N$ and crossing angle $θ_N$ are computed with respect to all nodes $N_N$ in the investigating section, the crossing angle $θ_N$ is divided by the length $L_N$ with respect to each node $N_N$ in step S5, so that the passing state decision quantity (vehicle turning quantity) $θ_N/L_N$ can be computed. In this connection, instead of obtaining the passing state decision quantity in the form of $θ_N/L_N$, it may be obtained in the form of $θ_N/(L_{N-1}/2+L_N/2)$ by using the link lengths $L_{N-1}$, $L_N$ before and behind the node $N_N$.

Next, in step S6, the passable speed $V_{maxN}$ at each reference node $N_N$ is computed. In this case, the passable speed $V_{maxN}$ is computed as follows. Yaw rate YR of the own vehicle at the node $N_N$ is given by $θ_N/t$ in which the crossing angle $θ_N$, which is a change quantity in the advancing direction of the vehicle, is divided by time "t" which is required for the generation of crossing angle $θ_N$. Time "t" is given by $L_N/V$ in which link length $L_N$ is divided by vehicle speed V at which the vehicle passes through link length $L_N$. Therefore, yaw rate YR is finally computed in such a manner that the passing state decision quantity $θ_N/L_N$ is multiplied by the vehicle speed V.

[Equation 1]

$$YR = \frac{θ_N}{t} = \frac{θ_N}{L_N/V} = (θ_N/L_N)V \quad (1)$$

On the other hand, lateral acceleration G of the vehicle is obtained when yaw rate YR is multiplied by the vehicle speed V.

[Equation 2]

$$G=(YR)V \quad (2)$$

In step S6, the following equation can be provided from the above equations (1) and (2).

[Equation 3]

$$V_{maxN}=\{G/(θ_N/L_N)\}^{1/2} \quad (3)$$

The above Equation (3) shows the following. When limit lateral acceleration G, which is a setting limit to be allowed when the vehicle passes through a curve, is determined, it is possible to obtain passable speed $V_{maxN}$ in the case where the vehicle passes through the curve, according to the setting limit lateral acceleration G and passing state decision quantity $θ_N/L_N$. The passable speed $V_{maxN}$ is the maximum vehicle speed at which the vehicle can pass through the curve under the condition that the lateral acceleration of the vehicle does not exceed the setting limit lateral acceleration G.

In step S7, on the assumption that the own vehicle is decelerated from the own vehicle position P at the reference deceleration β, the passage predicting speed $V_N$ at which the own vehicle passes through the node $N_N$ is computed by the following Equation (4), wherein a distance from the own vehicle position P to the node $N_N$ is $S_N$.

[Equation 4]

$$V_N = (V^2 - 2\beta S_N)^{1/2} \quad (4)$$

In step S8, the passage predicting speed $V_N$ is compared with the passable speed $V_{maxN}$. When $V_N \leq V_{maxN}$, it is decided that the vehicle can pass through node $N_N$. When $V_N > V_{maxN}$, it is decided that the vehicle can not pass through the node $N_N$. When it is decided that the vehicle can not pass through node $N_N$, the warning device is operated in step S9 so that the driver can be pressed for reducing the speed, and at the same time, the vehicle speed adjusting device is operated so that the vehicle speed can be automatically reduced. Due to the foregoing, the driver applies the brake spontaneously, or automatic speed reduction is conducted, and the vehicle speed is reduced. Therefore, it is possible for the vehicle to pass through the curve positively.

The above fundamental control of the vehicle speed is carried out when the own vehicle correctly exists on the designated road. However, when the own vehicle does not exist on the designated road or when it is not clear that the own vehicle is on the designated road, the fundamental control of the vehicle speed is stopped or suppressed. This will be explained as follows referring to a flow chart for deciding on-route shown in FIG. 5.

Figure 6:
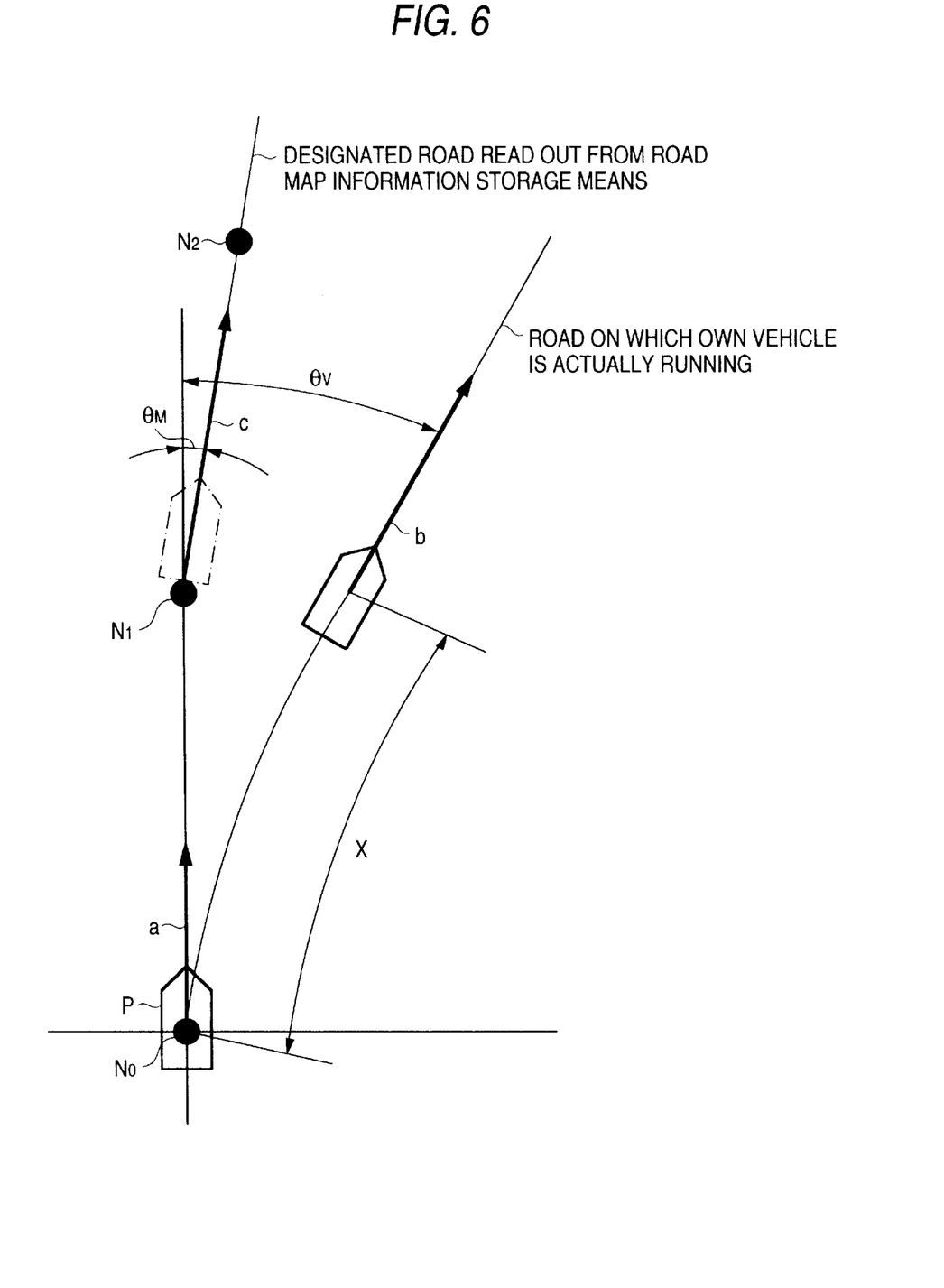
FIG. 6 is a schematic illustration of direction $\theta_M$ of a road and advancing direction $\theta_V$ of an own vehicle.

In FIG. 6, at the node $N_0$, which is appropriately selected and used as a reference, the own vehicle is directed in the direction of arrow "a" which is directed to the next node $N_1$. Under the above condition, the own vehicle turns aside from the designated road and advances into a branch, and then the own vehicle runs by distance X. In this case, the advancing direction of the own vehicle is represented by the arrow "b" in the drawing. An azimuth angle of the advancing direction of the own vehicle is expressed by $\theta_V$ when the direction of arrow "a", which is the first advancing direction of the own vehicle, is used as a reference. When the own vehicle does not advance into the branch and runs on the designated road by distance X and reaches a position shown by a chain line, a direction of this designated road is expressed by the arrow "c". In this case, an azimuth angle of the designated road is expressed by $\theta_M$ when the direction of arrow "a", which is the first advancing direction of the own vehicle, is used as a reference. Accordingly, when a case in which the own vehicle is correctly running on the designated road is compared with a case in which the own vehicle turns aside from the designated road, deviation $\Delta\theta$ corresponding to $\theta_V - \theta_M$ is generated.

In this connection, the advancing direction $\theta_V$ of the own vehicle can be obtained when yaw rate YR detected by the yaw rate sensor is integrated, and the running distance X can be obtained when the vehicle speed V detected by the vehicle speed sensor is integrated.

Figure 5:
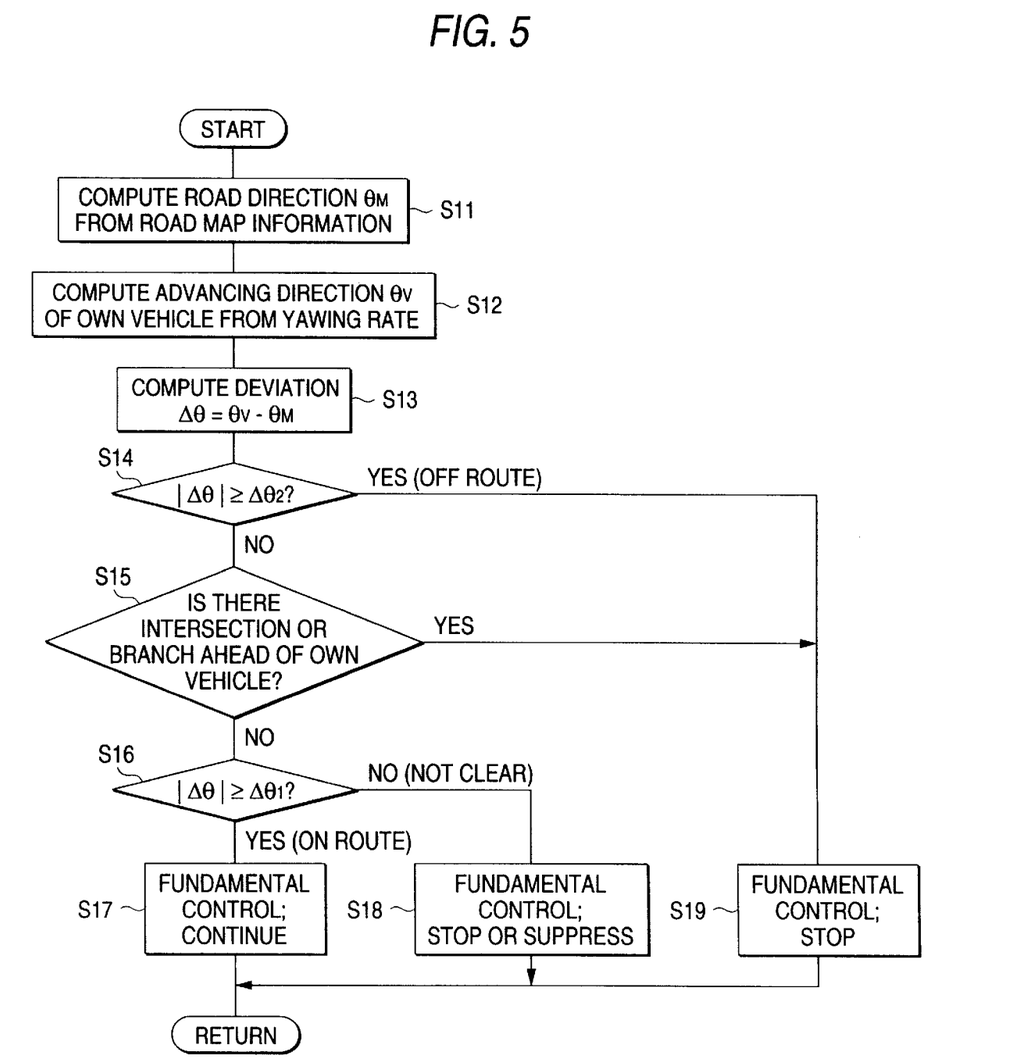
FIG. 5 is a flow chart of an on-route decision routine.

When the deviation $\Delta\theta = \theta_V - \theta_M$ is computed in steps S11 to S13 on the flow chart shown in FIG. 5 in the manner described above, absolute value $|\Delta\theta|$ of the deviation $\Delta\theta = \theta_V - \theta_M$ is compared with the first threshold value $\theta_1$ and the second threshold value $\theta_2$. In this connection, when the direction of $\theta_V$ is the same as the direction of $\theta_M$ with respect to the arrow "a", absolute value of $\Delta\theta$ is given by $|\Delta\theta| = |\theta_V| - |\theta_M|$, and when the direction of $\theta_V$ is reverse to the direction of $\theta_M$ with respect to the arrow "a", absolute value of $\Delta\theta$ is given by $|\Delta\theta| = |\theta_V - \theta_M|$.

Figure 7:
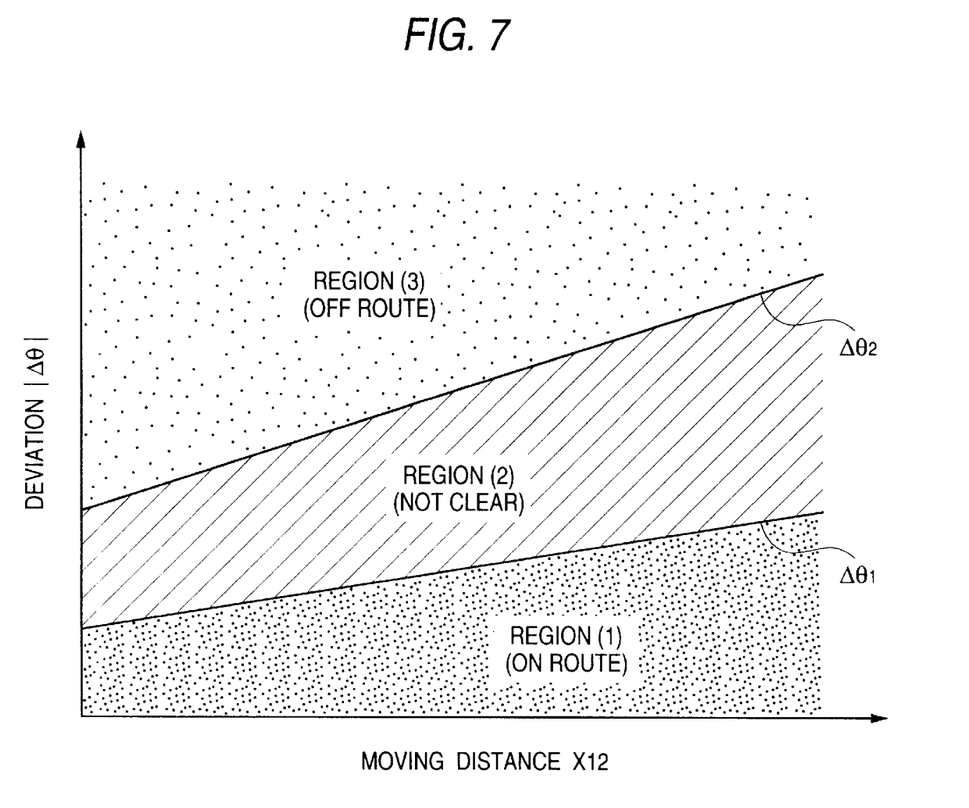
FIG. 7 is a schematic illustration of three controlling regions.

On the map shown in FIG. 7, the vertical axis represents an absolute value $|\Delta\theta|$, and the horizontal axis represents the moving distance X. A space on the map shown in FIG. 7 is divided into regions (1) to (3) by the first threshold value $\Delta\theta_1$ and the second threshold value $\Delta\theta_2$ which are expressed by two straight lines. In region (1), an absolute value of the deviation $|\Delta\theta|$ is low. At this time, it is decided that the probability of existence of the own vehicle on the designated road is high, that is, it is decided that the own vehicle is on route. Therefore, the fundamental control (warning and vehicle speed control) explained by the flow chart shown in FIG. 3 is continued as it is (step S17). In region (3), absolute value of the deviation $|\Delta\theta|$ is high. At this time, it is decided that the probability of existence of the own vehicle on the designated road is low, that is, it is decided that the own vehicle is off route. Therefore, the above fundamental control is stopped (step S19). In region (2), absolute value of the deviation $|\Delta\theta|$ is intermediate. In this case, it is decided that it is not clear whether or not the own vehicle is on the designated road. Therefore, the above fundamental control is suppressed (step S18). Suppression of the fundamental control includes: not conducting an automatic braking operation but giving only a warning; and reducing a rise of a braking force in automatic braking operation and also reducing a maximum value of the braking force. In this connection, it is possible to stop the fundamental control in region (2) instead of suppressing it.

The reason why straight lines of the first threshold value $\Delta\theta_1$ and the second threshold value $\Delta\theta_2$ rise up when it comes to the right is described as follows. When the moving distance X of the own vehicle increases, absolute value $|\Delta\theta|$ of the deviation tends to accumulate and increase. Therefore, on the assumption that the straight lines of the first threshold value $\Delta\theta_1$ and the second threshold value $\Delta\theta_2$ are horizontal, due to the accumulation of errors, there is a possibility of mistaken decision that the own vehicle is in a state of off-route although the own vehicle is actually in a state of on-route.

When the own vehicle is not off route in step S14 and there is an intersection or a branch in front of the designated road in step S15, the program is transferred to step S19, and the vehicle control ahead of the intersection or branch is stopped. The reason is described as follows. Even if the own vehicle is guided in a route according to the designated road, it is not clear whether or not the own vehicle advances into the designated road in front of the intersection or branch. Accordingly, there is a possibility that the driver feels a sense of incongruity when the vehicle control is conducted according to a profile of the road in front of the intersection or branch.

As described above, it is decided whether or not the own vehicle correctly exists on the designated road. When the own vehicle turns aside from the designated road, or when there is a possibility that the own vehicle turns aside from the designated road, a warning is given to the driver or the vehicle control is stopped or suppressed. Consequently, there is no possibility that vehicle control, which is not suitable for a profile of the road on which the own vehicle is running, is conducted and the driver feels a sense of incongruity.

One embodiment of the present invention is described in detail above. Variation may be made in design by one skilled in the art without departing from the spirit and scope of the present invention.

For example, in the embodiment, the passable speed $V_{maxN}$ is computed according to setting limit lateral acceleration G, however, it is possible to compute the passable speed $V_{maxN}$ according to setting limit yaw rate YR instead of setting limit lateral acceleration G. That is, the passable speed $V_{maxN}$ may be computed by the following equation (5), wherein yaw rate YR is obtained from the above equation (1).

[Equation 5]

$$V_{maxN} = \frac{YR}{\theta_N / L_N} \quad (5)$$

Figure 8A:
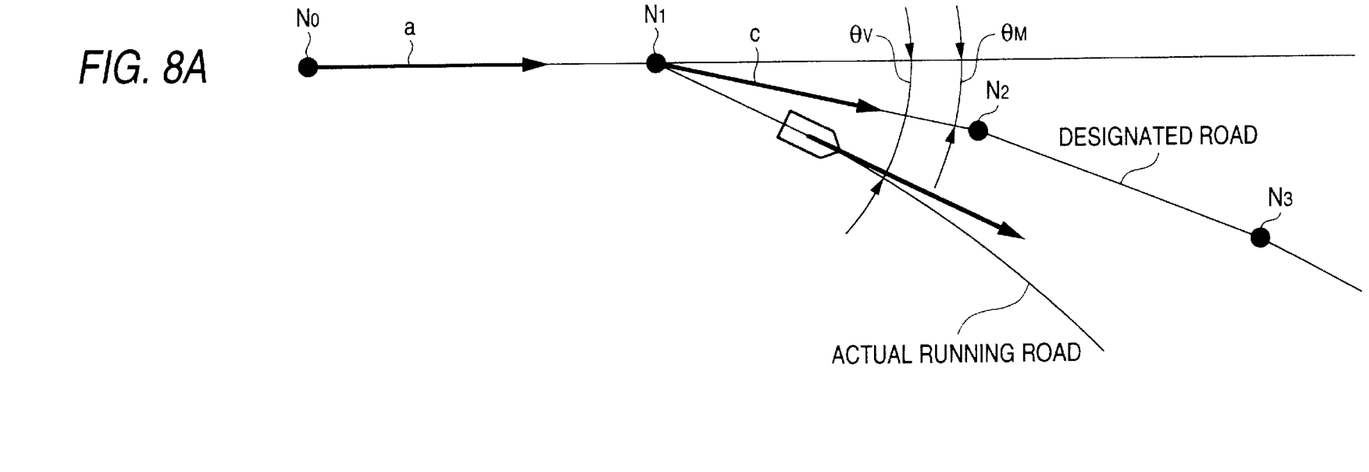
FIGS. 8A and 8B are schematic illustrations of another definition of direction $\theta_M$ of a road.
Figure 8B:
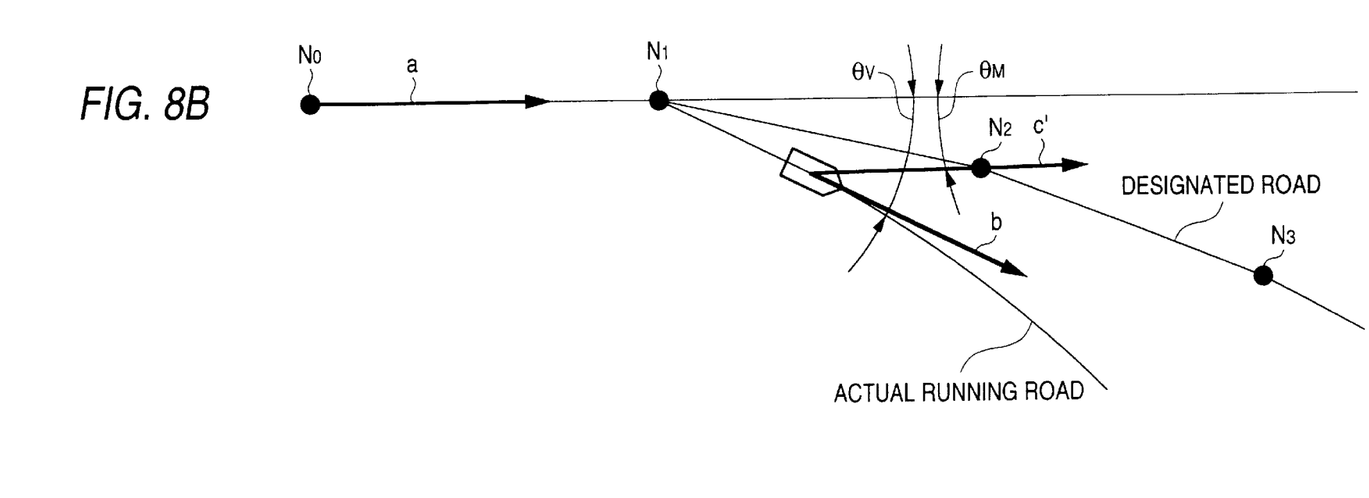

In the above embodiment, as shown in FIG. 8A, an azimuth angle $\theta_M$ of the designated road is defined as a direction "c" extending from node $N_1$ to node $N_2$. However, as shown in FIG. 8B, an azimuth angle $\theta_M$ of the designated road may be defined as a direction "c'" extending from own vehicle position P to node $N_2$. In this case, own vehicle position P can be computed according to yaw rate YR, which has been detected by the yaw rate sensor in reference to the coordinate of node $N_1$, and also according to the vehicle speed V detected by the vehicle speed sensor.

When the deviation $\Delta\theta$ is computed, instead that the azimuth angle $\theta_V$ of the advancing direction of the own vehicle and the azimuth angle $\theta_M$ of the designated road are directly compared with each other, differential values of the azimuth angles $\theta_V$ and $\theta_M$ may be compared with each other, or integral values of the azimuth angles $\theta_V$ and $\theta_M$ may be compared with each other.

As described above, according to the invention, it is decided whether or not the own vehicle is running on the designated road ahead of the own vehicle which has been read from the road map information storing device, and a running state of the own vehicle is controlled according to the result of the decision. Therefore, it is possible to prevent the own vehicle from being improperly controlled when it is running on a road which is not the designated road. Accordingly, the driver can avoid feeling a sense of incongruity.

Specifically, whether or not the own vehicle is actually running on the designated road is decided by deviation between a direction of the designated road and an advancing direction of the own vehicle. Therefore, the decision can be accurately made.

In addition, as a moving distance of the own vehicle is increased, the first and the second threshold value are also increased. Therefore, even if errors are accumulated so that the deviation is increased, it is possible to prevent the occurrence of a mistaken decision that the own vehicle is in a state of off-route although it is actually running in a state of on-route.

Further, when it is decided that the own vehicle can not pass through the designated road, the driver is given a warning or the speed of the own vehicle is adjusted. Accordingly, it is possible to change a running state of the car and pass through the designated road positively.

When the probability that the own vehicle is running on the designated road is low, control of the running state of the own vehicle is suppressed. Therefore, it is possible to avoid the occurrence of such a case that an improper vehicle control, which is not suitable for a profile of the road on which the own vehicle is running, is conducted and the driver feels a sense of incongruity.

Even if the own vehicle deviates from the designated road at an intersection or a branch, it is possible to avoid the occurrence of such a case that an improper vehicle control, which is not suitable for a profile of the road on which the own vehicle is running, is conducted and the driver feels a sense of incongruity.

The present disclosure relates to the subject matter contained in Japanese patent application No. Hei. 10-196260 filed on Jul. 10, 1999 which is expressly incorporated herein by reference in its entirety.

What is claimed is:

1. A vehicular running control apparatus, comprising:
a road map information storing device storing road map information;
an own vehicle position detecting device detecting an own vehicle position on a road;
a running state detecting device detecting a running state of the own vehicle;
a passage deciding device deciding whether or not the own vehicle is passable through a designated road, according to a profile of the designated road in the front of the own vehicle which has been read from said road map information storing device and the running state of the own vehicle detected by said running state detecting device;
a vehicle controlling device controlling the running state of the own vehicle according to a result of the decision of said passage deciding device so that the own vehicle passes through the designated road; and
an on-route deciding device deciding whether or not the own vehicle is actually running on the designated road, wherein said vehicle controlling device changes control of the own vehicle according to the result of decision of said on-route deciding device.

2. A vehicular running control apparatus according to claim 1, wherein said on-route deciding device decides a probability that the own vehicle is actually running on the designated road.

3. A vehicular running control apparatus according to claim 1, wherein said on-route deciding device conducts the decision according to deviation between a direction of the designated road and an advancing direction of the own vehicle detected by said running state detecting device.

4. A vehicular running control apparatus according to claim 3, wherein said on-route deciding device decides that the own vehicle is actually running on the designated road when the deviation is lower than a first threshold value.

5. A vehicular running control apparatus according to claim 4, wherein the first threshold value increases according to an increase in moving distance of the own vehicle.

6. A vehicular running control apparatus according to claim 4, wherein said on-route deciding device decides that the own vehicle is not actually running on the designated road when the deviation is not less than a second threshold value which is higher than the first threshold value.

7. A vehicular running control apparatus according to claim 6, wherein the first threshold value and the second threshold value increase according to an increase in moving distance of the own vehicle.

8. A vehicular running control apparatus according to claim 1, wherein said vehicle controlling device comprises at least one of a warning device providing a warning to a driver and a vehicle speed adjusting device conducting a vehicle speed adjustment of the own vehicle so as to control the running state of the own vehicle.

9. A vehicular running control apparatus according to claim 2, wherein said vehicle controlling device suppresses control of the running state of the own vehicle according to a decrease in the probability decided by said on-route deciding device.

10. A vehicular running control apparatus according to claim 1, wherein when an intersection or a branch exists on the designated road, said vehicle controlling device stops controlling the running state of the own vehicle on a road ahead of the intersection or the branch.

* * * * *